(12) United States Patent
Puiu

(10) Patent No.: US 8,795,115 B2
(45) Date of Patent: Aug. 5, 2014

(54) HYBRID DUAL CONFIGURATION TRANSMISSION

(75) Inventor: Dumitru Puiu, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 251 days.

(21) Appl. No.: 13/371,698

(22) Filed: Feb. 13, 2012

(65) Prior Publication Data

US 2013/0210567 A1  Aug. 15, 2013

(51) Int. Cl.
F16H 3/72 (2006.01)

(52) U.S. Cl.
USPC ................................. 475/5; 475/207; 903/919

(58) Field of Classification Search
USPC ........................................ 475/207, 5; 903/919
See application file for complete search history.

(56) References Cited

U.S. PATENT DOCUMENTS

| | | | |
|---|---|---|---|
| 7,427,252 B2 * | 9/2008 | Holmes | 475/5 |
| 7,575,529 B2 * | 8/2009 | Holmes | 475/5 |
| 8,585,522 B2 * | 11/2013 | Kaltenbach et al. | 475/5 |
| 2008/0064550 A1 * | 3/2008 | Holmes | 475/5 |
| 2012/0021861 A1 | 1/2012 | Sakai et al. | |
| 2013/0324341 A1 * | 12/2013 | Cho et al. | 475/5 |

FOREIGN PATENT DOCUMENTS

| | | | |
|---|---|---|---|
| DE | 10 2007 022 774 | * | 11/2008 |
| DE | 102007022774 A1 | | 11/2008 |
| DE | 102007042949 A1 | | 4/2009 |

OTHER PUBLICATIONS

International Search Report and Written Opinion dated Jul. 16, 2013 for International Application No. PCT/US2013/025095, International Filing Date Feb. 7, 2013.

* cited by examiner

*Primary Examiner* — Sherry Estremsky
(74) *Attorney, Agent, or Firm* — Ralph E Smith

(57) ABSTRACT

A hybrid dual configuration transmission for a vehicle having an electric motor, planetary gear set and a plurality of gear meshes is disclosed herein. The hybrid dual configuration transmission provides for a plurality of electrically variable transmission operating modes and a plurality of fixed gear operating modes. The hybrid dual configuration transmission may be operated utilizing exclusively the electric motor, exclusively an engine, or any combination of the electric motor and engine.

16 Claims, 4 Drawing Sheets

| MODE | C1 | C2 | FIRST/FIFTH GEAR DOG CLUTCH | | SECOND/SIXTH GEAR DOG CLUTCH | | THIRD/REVERSE GEAR DOG CLUTCH | | FOURTH GEAR DOG CLUTCH |
|---|---|---|---|---|---|---|---|---|---|
| | | | 1ST GEAR | 5TH GEAR | 2ND GEAR | 6TH GEAR | 3RD GEAR | REVERSE GEAR | OUTPUT DRIVEN GEAR |
| EVT - 1ST GEAR | X | | X | | | | | | |
| FIXED GEAR - 1ST GEAR | X | X | X | | | | | | |
| FIXED ENGINE DRIVE - 2ND GEAR | | X | | | X | | | | |
| FIXED GEAR - 2ND GEAR | X | X | | | X | | | | |
| EVT - 3RD GEAR | X | | | | | | X | | |
| FIXED GEAR - 3RD GEAR | X | X | | | | | X | | |
| FIXED ENGINE DRIVE - 4TH GEAR | | X | | | | | | | X |
| FIXED GEAR - 4TH GEAR | X | X | | | | | | | X |
| EVT - 5TH GEAR | X | | | X | | | | | |
| FIXED GEAR - 5TH GEAR | X | X | | X | | | | | |
| FIXED ENGINE DRIVE - 6TH GEAR | | X | | | | X | | | |
| FIXED GEAR - 6TH GEAR | X | X | | | | X | | | |
| EVT - REVERSE GEAR | X | | | | | | | X | |
| FIXED GEAR - REVERSE GEAR | X | X | | | | | | X | |

FIG. 2

| MODE | C1 | C2 | FIRST/FIFTH GEAR DOG CLUTCH | | SECOND/SIXTH GEAR DOG CLUTCH | | THIRD/REVERSE GEAR DOG CLUTCH | | FOURTH GEAR DOG CLUTCH |
|---|---|---|---|---|---|---|---|---|---|
| | | | 1ST GEAR | 5TH GEAR | 2ND GEAR | 6TH GEAR | 3RD GEAR | REVERSE GEAR | OUTPUT DRIVEN GEAR |
| EV | | X | | | X | | | X | |
| EV (ENGINE START) | X | | | | X | | | X | |
| EV - 1ST GEAR | X | | X | | | | | | |
| EVT - 1ST GEAR | X | X | X | | | | | | |
| FIXED GEAR - 1ST GEAR | X | X | X | | | | | | |
| EV - 2ND GEAR | X | | | | X | | | | |
| FIXED GEAR - 2ND GEAR | X | X | | | X | | | | |
| EV - 3RD GEAR | | X | | | | | X | | |
| EVT - 3RD GEAR | X | X | | | | | X | | |
| FIXED GEAR - 3RD GEAR | X | X | | | | | X | | |
| EV - 4TH GEAR | X | | | | | | | | X |
| FIXED GEAR - 4TH GEAR | X | X | | | | | | | X |
| EV - 5TH GEAR | | X | | X | | | | | |
| EVT - 5TH GEAR | X | X | | X | | | | | |
| FIXED GEAR - 5TH GEAR | X | X | | X | | | | | |
| EV - 6TH GEAR | X | | | | | X | | | |
| FIXED GEAR - 6TH GEAR | X | X | | | | X | | | |
| EV - REVERSE GEAR | X | | | | | | | X | |
| EVT - REVERSE GEAR | | X | | | | | | X | |
| FIXED GEAR - REVERSE GEAR | X | X | | | | | | X | |

FIG. 4

HYBRID DUAL CONFIGURATION TRANSMISSION

FIELD

The present disclosure relates to a hybrid dual configuration transmission and, more particularly, to a hybrid dual configuration transmission having a plurality of gear meshes, a power split planetary gear set, and an electric motor.

BACKGROUND

Most current transmissions utilize a manual transmission or automatic transmission architecture. While each design has its benefits, each also has its drawbacks. For example, an automatic transmission typically features many planetary gear sets and many hydraulically activated clutches. The planetary gear sets create friction, thereby, reducing the efficiency of the automatic transmission compared to a manual transmission. Likewise, the multiple hydraulically activated clutches of a typical automatic transmission require that the transmission generate hydraulic pressure to activate or deactivate the clutches, thereby, also decreasing efficiency. Moreover, the automatic transmission may be rendered inoperable should hydraulic pressure within the transmission be compromised. Manual transmissions generally are designed either as a single clutch manual transmission or as a dual clutch transmission, both of which generally provide for improved efficiency over automatic transmissions. However, power transmission in a typical manual transmission is temporarily interrupted when shifting between gears, thereby, compromising performance and ride comfort.

To improve transmission and overall vehicle efficiency and performance, electric motors have been coupled with automatic transmissions to provide torque separately or in combination with a vehicle engine. However, the inherent inefficiencies of an automatic transmission are not eliminated by the introduction of the electric motor. The complexity of pairing an electric motor with a manual transmission has generally prevented the use of electric motors in manual transmissions. While many transmission configurations generally work for their intended purpose, further improvement is desirable.

SUMMARY

In one form, the present disclosure provides a hybrid transmission including a transmission input shaft, an electric motor, a planetary gear set coupled to the electric motor, a first clutch mechanism coupled to the planetary gear set. The hybrid transmission further includes a second clutch mechanism coupled to the transmission input shaft and the planetary gear set, a first input shaft coupled to the planetary gear set, and a second input shaft coupled to the second clutch mechanism.

In another form, the present disclosure provides a method of operating a hybrid transmission including a transmission input shaft, an electric motor, a planetary gear set coupled to the electric motor, a first clutch mechanism coupled to the planetary gear set, a second clutch mechanism coupled to the transmission input shaft and the planetary gear set. The hybrid transmission further includes a first input shaft coupled to the planetary gear set, a second input shaft coupled to the second clutch mechanism, an output shaft, a first plurality of gears coupled to the output shaft, and a second plurality of gears coupled to the output shaft. The first input shaft is coupled to the first plurality of gears to provide a first plurality of gear ratios between the transmission input shaft and the output shaft, and the second input shaft is coupled to the second plurality of gears to provide a second plurality of gear ratios between the transmission input shaft and the output shaft. The method includes placing the first clutch mechanism in a deactivated state and, if the second clutch mechanism is in a deactivated state, engaging a gear ratio from the second plurality of gear ratios, activating the second clutch mechanism after the gear ratio from the second plurality of gear ratios is engaged, and disengaging a gear ratio from the first plurality of gear ratios after the second clutch mechanism is activated. The method also includes, if the second clutch mechanism is in an activated state, engaging a gear ratio from the first plurality of gear ratios, and deactivating the second clutch mechanism after the gear ratio from the first plurality of gear ratios is engaged.

In another form, the present disclosure provides method of operating a hybrid transmission including a transmission input shaft, an electric motor, a planetary gear set coupled to the electric motor, a first clutch mechanism coupled to the planetary gear set, a second clutch mechanism coupled to the transmission input shaft and the planetary gear set, a first input shaft coupled to the planetary gear set, a second input shaft coupled to the second clutch mechanism, an output shaft, a first plurality of gears coupled to the output shaft, and a second plurality of gears coupled to the output shaft. The first input shaft is coupled to the first plurality of gears to provide a first plurality of gear ratios between the transmission input shaft and the output shaft, and the second input shaft is coupled to the second plurality of gears to provide a second plurality of gear ratios between the transmission input shaft and the output shaft. The method includes placing the first clutch mechanism in a deactivated state and placing the second clutch mechanism in an activated state. If a gear ratio from the second plurality of gear ratios is to be engaged, the method includes engaging a gear ratio from the second plurality of gear ratios, and disengaging a gear ratio from the first plurality of gear ratios after the gear ratio from the second plurality of gear ratios is engaged. If a gear ratio from the first plurality of gear ratios is to be engaged, the method includes engaging a gear ratio from the first plurality of gear ratios, and disengaging a gear ratio from the second plurality of gear ratios after the gear ratio from the first plurality of gear ratios is engaged.

Thus, a hybrid dual configuration transmission having improved efficiency and smooth shifting is provided. The hybrid dual configuration transmission provides improved operating configurations and a torque boost when required. The hybrid dual configuration transmission provides for smooth vehicle launching, start/stop functionality, regenerative braking, and a hill hold feature.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

BRIEF DESCRIPTION OF THE DRAWINGS

FIG. 2 is a table showing exemplary operating modes of the hybrid dual configuration transmission of FIG. 1;

FIG. 4 is a table showing exemplary operating modes of the hybrid dual configuration transmission of FIG. 3.

DETAILED DESCRIPTION

Disclosed herein are exemplary embodiments of a manual transmission that features an electric motor to provide improved vehicle efficiency, reduced complexity, and smooth shifting. Disclosed herein are also exemplary embodiments of a hybrid transmission capable of operating in the event of a hydraulic failure. Embodiments of the hybrid transmission provide engine start/stop capability at any vehicle speed (including zero), creep torque, electric drive at any speeds, silent start, regenerative braking capabilities, synchronous shifting, and vehicle launching capability in an electronically variable transmission mode.

Figure 1:
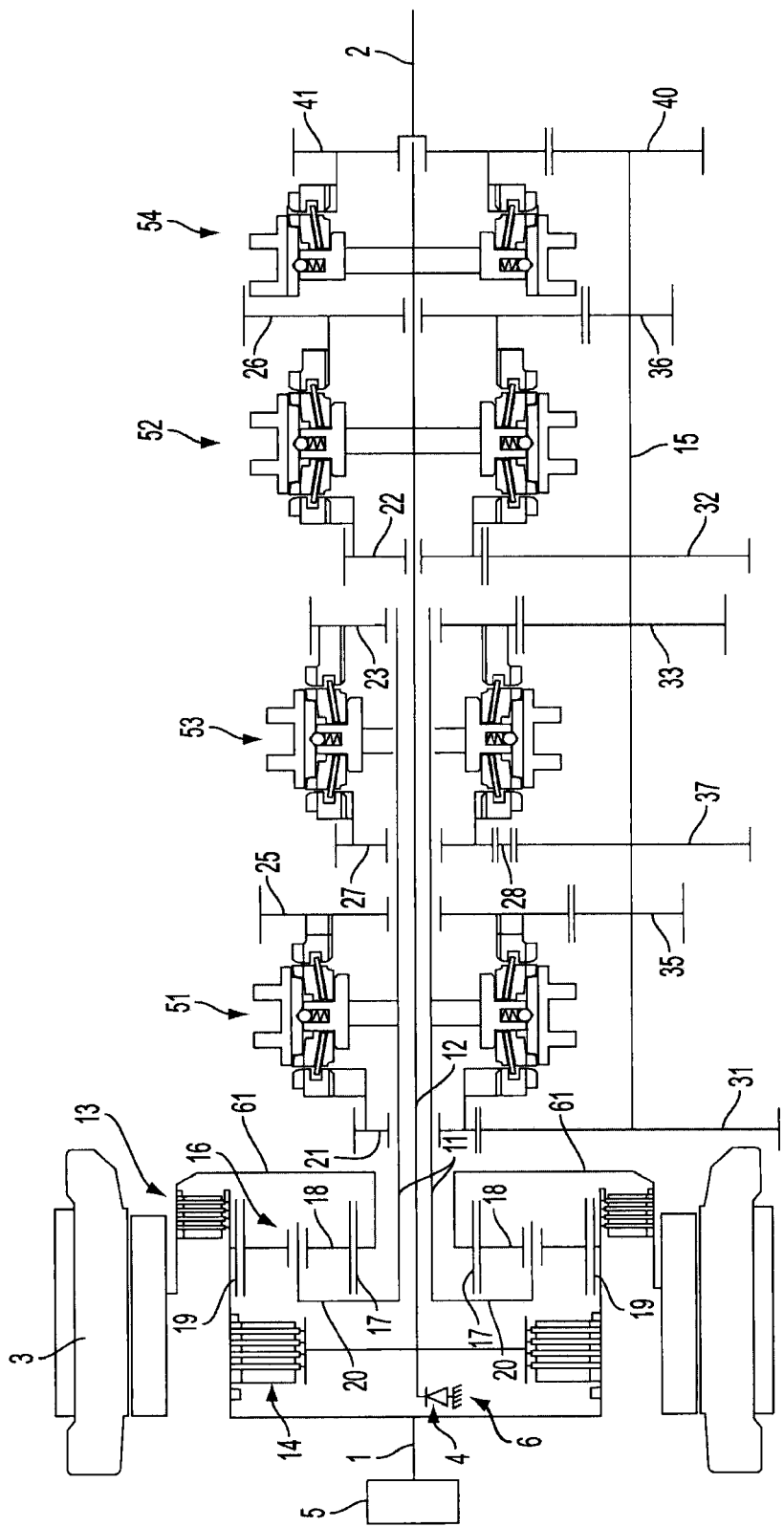
FIG. 1 is a schematic representation of an exemplary hybrid dual configuration transmission according to the principles of the present disclosure.

FIG. 1 illustrates an example schematic representation of an exemplary hybrid dual configuration transmission according to the principles of the present disclosure. The transmission includes a transmission input shaft 1 by which torque may be introduced into the transmission. The transmission input shaft 1 may be coupled to an engine 5 or any other torque source. The transmission input shaft 1 is also coupled to a first clutch mechanism 13 and second clutch mechanism 14. The first clutch mechanism 13 selectively couples a ring gear 19 of a power split planetary gear set 16 via a shaft 61 to a sun gear 17 of the power split planetary gear set 16. Pinion gears 18 of the power split planetary gear set 16 are continuously meshed with the sun gear 17 and ring gear 19. The pinion gears 18 are rotatably mounted on a carrier 20 of the power split planetary gear set 16. The carrier 20 is coupled to a first input shaft 11. Activation of the first clutch mechanism 13 non-rotatably couples the sun gear 17 to the ring gear 19 and transmission input shaft 1, thereby, locking together the power split planetary gear set 16 causing the transmission input shaft 1, sun gear 17, ring gear 19, and carrier 20 to rotate at the same speed. Shaft 61 also couples an electric motor 3 to the sun gear 17.

The second clutch mechanism 14 selectively couples the transmission input shaft 1 to a second input shaft 12 through a one way clutch 4. The one way clutch 4 permits the second input shaft 12 to rotate with respect to the transmission housing 6 in a first direction, but prevents rotation of the second input shaft 12 in the opposite direction. In one embodiment, the one way clutch 4 may be on the output shaft 2 side of the second clutch mechanism 14. In one embodiment, the one way clutch 4 may be on the engine 5 side of the second clutch mechanism 14. The first input shaft 11 is concentric with and, in one embodiment, surrounds a portion of the second input shaft 12. Activation of the second clutch mechanism 14 non-rotatably couples the transmission input shaft 1 to the second input shaft 12, thereby, causing the transmission input shaft 1 and second input shaft 12 to rotate at the same speed.

The first input shaft 11 includes a plurality of rotatably attached gears 21, 23, 25, 27 capable of rotating independently of the first input shaft 11. The plurality of gears 21, 23, 25, 27 rotatably attached to the first input shaft 11 include a first driver gear 21, third driver gear 23, fifth driver gear 25, and reverse driver gear 27. A plurality of gears 22, 26 are rotatably attached to the second input shaft 12 and are capable of rotating independently of the second input shaft 11. The plurality of gears 22, 26 rotatably attached to the second input shaft 12 include a second driver gear 22 and sixth driver gear 26. An output driven gear 41 is non-rotatably coupled to the output shaft 2 by which torque is transmitted out of the transmission.

The transmission also includes a layshaft 15 parallel to the first input shaft 11 and second input shaft 12. The layshaft 15 includes a plurality of fixedly attached gears 31, 32, 33, 35, 36, 37, 40. The fixedly attached gears 31, 32, 33, 35, 36, 37, 40 rotate at the same angular velocity as the layshaft 15. The fixedly attached gears 31, 32, 33, 35, 36, 37, 40 include a first driven gear 31, second driven gear 32, third driven gear 33, fifth driven gear 35, sixth driven gear 36, reverse driven gear 37, and output driver gear 40.

Respective gears on the first input shaft 11, second input shaft 12, and layshaft 15 are continually meshed with one another. In particular, the first driver gear 21 is continuously meshed with the first driven gear 31, the second driver gear 22 is continuously meshed with the second driven gear 32, the third driver gear 23 is continuously meshed with the third driven gear 33, the fifth driver gear 25 is continuously meshed with the fifth driven gear 35, and the sixth driver gear 26 is continuously meshed with the sixth driven gear 36. The output driver gear 40 is continuously meshed with the output driven gear 41. The reverse driver gear 27 is continuously meshed with a reverse idler gear 28. The reverse idler gear 28 is also continuously meshed with the reverse driven gear 37.

The first input shaft 11 and second input shaft 12 also include a plurality of synchronizer mechanisms (e.g., dog clutches) 51, 52, 53, 54 to selectively lock a rotatably attached gear 21, 22, 23, 25, 26, 27, 41 to its respective first input shaft 11 or second input shaft 12. The first/fifth gear dog clutch 51 and third/reverse gear dog clutch 53 are non-rotatably coupled to the first input shaft 11. The second/sixth gear dog clutch 52 and fourth gear dog clutch 54 are non-rotatably coupled to the second input shaft 12. A first/fifth gear dog clutch 51 is attached to the first input shaft 11 between the first driver gear 21 and fifth driver gear 25. The first/fifth gear dog clutch 51 may be moved axially along the first input shaft 11 in the direction of the first driver gear 21 or moved axially along the first input shaft 11 in the opposite direction towards the fifth driver gear 25. A second/sixth gear dog clutch 52 is attached to the second input shaft 12 between the second driver gear 22 and sixth driver gear 26. The second/sixth gear dog clutch 52 may be moved axially along the second input shaft 12 in the direction of the second driver gear 22 or moved axially along the second input shaft 12 in the opposite direction towards the sixth driver gear 26. A third/reverse gear dog clutch 53 is attached to the first input shaft 11 between the third driver gear 23 and reverse driver gear 27. The third/reverse gear dog clutch 53 may be moved axially along the first input shaft 11 in the direction of the third driver gear 23 or moved axially along the first input shaft 11 in the opposite direction towards the reverse driver gear 27. A fourth gear dog clutch 54 is attached to the second input shaft 12 adjacent to the output driven gear 41. The fourth gear dog clutch 54 may be moved axially along the second input shaft 12 towards or away from the output driven gear 41.

Each of the synchronizer mechanisms 51, 52, 53, 54 may be moved axially along its respective first input shaft 11 or second input shaft 12 to contact one of the rotatably attached gears 21, 22, 23, 25, 26, 27, 41. Contact between one of the synchronizer mechanisms 51, 52, 53, 54 and a corresponding rotatably attached gear 21, 22, 23, 25, 26, 27, 41 keys the rotatably attached gear 21, 22, 23, 25, 26, 27, 41 to its corresponding synchronizer mechanism 51, 52, 53, 54 and, accordingly, to its respective first input shaft 11 or second input shaft 12. Thus, contact between the synchronizer mechanism 51, 52, 53, 54 and its respective gear 21, 22, 23, 25, 26, 27, 41 non-rotatably couples the gear 21, 22, 23, 25, 26, 27, 41 to its respective input shaft 11, 12 such that the gear 21, 22, 23, 25, 26, 27, 41 rotates at the same speed as its respective input shaft 11, 12.

FIG. 2 is a table showing example operating modes of the hybrid dual configuration transmission of FIG. 1. The transmission of FIG. 1 may be operated as an electrically variable transmission (EVT-1ST GEAR, EVT-3RD GEAR, EVT-5TH GEAR, EVT-REVERSE GEAR), in a fixed gear ratio using exclusively engine 5 power (FIXED ENGINE DRIVE-2ND GEAR, FIXED ENGINE DRIVE-4th GEAR, FIXED ENGINE DRIVE-6th GEAR), and in a fixed gear ratio using any combination of torque from the electric motor 3 and the engine 5 (FIXED GEAR-1ST GEAR, FIXED GEAR-2ND GEAR, FIXED GEAR-3RD GEAR, FIXED GEAR-4TH GEAR, FIXED GEAR-5TH GEAR, FIXED GEAR-6TH GEAR, FIXED GEAR-REVERSE GEAR). The first clutch mechanism 13 (shown as "C1"), second clutch mechanism 14 (shown as "C2"), first/fifth gear dog clutch 51, second/sixth gear dog clutch 52, third/reverse gear dog clutch 53, and fourth gear dog clutch 54, may be selectively activated to achieve the different operating states of the hybrid dual configuration transmission. An "X" indicates that the clutch mechanism has been activated, thereby, coupling together all components to which it is attached. A blank indicates that the clutch has been deactivated, thereby, allowing the components to which it is coupled to rotate independently of one another. With respect to the dog clutches, an "X" indicates that the dog clutch has been engaged with the indicated gear, thereby, coupling together the indicated gear, dog clutch, and associated shaft. A blank indicates that the dog clutch has not been activated, thereby, allowing the indicated gear to rotate independently of the dog clutch and associated shaft.

With reference to FIGS. 1 and 2, when the hybrid dual configuration transmission is to be operated in an electric variable transmission mode in a first gear (EVT-1ST GEAR), the first/fifth gear dog clutch 51 is moved into contact with the first driver gear 21, thereby, non-rotatably coupling the first driver gear 21 to the first input shaft 11. The first/fifth gear dog clutch 51, second/sixth gear dog clutch 52, third/reverse gear dog clutch 53, and fourth gear dog clutch 54 are kept out of contact with the second driver gear 22, third driver gear 23, fifth driver gear 25, sixth driver gear 26, reverse driver gear 27, and output driven gear 41. Thus, the third driver gear 23, fifth driver gear 25, and reverse driver gear 27 are free to rotate with respect to the first input shaft 11, and the second driver gear 22 and sixth driver gear 26, and output driven gear 41 are free to rotate with respect to the second input shaft 12. The first clutch mechanism 13 and second clutch mechanism 14 are deactivated. Thus, no clutch mechanism 13, 14 activation is required for propulsion in EVT-1ST GEAR. The ring gear 19 is free to rotate independently of the sun gear 17 and the second input shaft 12 is free to rotate independently of the transmission input shaft 1. Torque to power the output shaft 2 is provided by a combination of the engine 5 and the electric motor 3. In one embodiment, the one way clutch 4 provides a hill hold feature preventing a vehicle equipped with the hybrid dual configuration transmission from rolling backwards while still enabling the engine 5 to be started.

To operate the hybrid dual configuration transmission in fixed gear transmission mode in a first gear (FIXED GEAR-1ST GEAR), the first/fifth gear dog clutch 51 is moved into contact with the first driver gear 21, thereby, non-rotatably coupling the first driver gear 21 to the first input shaft 11. The first/fifth gear dog clutch 51, second/sixth gear dog clutch 52, third/reverse gear dog clutch 53, and fourth gear dog clutch 54 are kept out of contact with the second driver gear 22, third driver gear 23, fifth driver gear 25, sixth driver gear 26, reverse driver gear 27, and output driven gear 41. Thus, the third driver gear 23, fifth driver gear 25, and reverse driver gear 27 are free to rotate with respect to the first input shaft 11, and the second driver gear 22, sixth driver gear 26, and output driven gear 41 are free to rotate with respect to the second input shaft 12. The first clutch mechanism 13 is activated and the second clutch mechanism 14 is deactivated. Thus, the power split planetary gear set 16 is locked and the transmission input shaft 1, sun gear 17, ring gear 19, and electric motor 3 all rotate at the same speed. The second input shaft 12 is free to rotate independently of the transmission input shaft 1. Torque to power the output shaft 2 is provided by a combination of the engine 5 and the electric motor 3. Power from the engine 5 may be supplemented by the electric motor 3 whenever desired. In one embodiment, the hybrid dual configuration transmission may be switched from EVT-1ST GEAR operation to FIXED GEAR-1ST GEAR operation whenever additional torque to the output shaft 2 is required. Switching from EVT-1ST GEAR operation to FIXED GEAR-1ST GEAR simply requires the activation of the first clutch mechanism 13. Deactivation of the first clutch mechanism 13 returns the hybrid dual configuration transmission to EVT-1ST GEAR operation.

To operate the hybrid dual configuration transmission in a fixed gear engine drive mode in a second gear (FIXED ENGINE DRIVE-2ND GEAR), the second/sixth gear dog clutch 52 is moved into contact with the second driver gear 22, thereby, non-rotatably coupling the second driver gear 22 to the second input shaft 12. The first/fifth gear dog clutch 51, second/sixth gear dog clutch 52, third/reverse gear dog clutch 53, and fourth gear dog clutch 54 are kept out of contact with the first driver gear 21, third driver gear 23, fifth driver gear 25, sixth driver gear 26, reverse driver gear 27, and output driven gear 41. Thus, the first driver gear 21, third driver gear 23, fifth driver gear 25, and reverse driver gear 27 are free to rotate with respect to the first input shaft 11, and the sixth driver gear 26, and output driven gear 41 are free to rotate with respect to the second input shaft 12. The first clutch mechanism 13 is deactivated and the second clutch mechanism 14 is activated. Thus, the ring gear 19 is free to rotate independently of the sun gear 17. The second input shaft 12 is coupled to and rotates at the same speed as the transmission input shaft 1. Torque to power the output shaft 2 is provided by the engine 5.

To operate the hybrid dual configuration transmission in fixed gear transmission mode in a second gear (FIXED GEAR-2ND GEAR), the second/sixth gear dog clutch 52 is moved into contact with the second driver gear 22, thereby, non-rotatably coupling the second driver gear 22 to the second input shaft 12. The first/fifth gear dog clutch 51, second/sixth gear dog clutch 52, third/reverse gear dog clutch 53, and fourth gear dog clutch 54 are kept out of contact with the first driver gear 21, third driver gear 23, fifth driver gear 25, sixth driver gear 26, reverse driver gear 27, and output driven gear 41. Thus, the first driver gear 21, third driver gear 23, fifth driver gear 25, and reverse driver gear 27 are free to rotate with respect to the first input shaft 11, and the sixth driver gear 26, and output driven gear 41 are free to rotate with respect to the second input shaft 12. The first clutch mechanism 13 and second clutch mechanism 14 are activated. Thus, the power split planetary gear set 16 is locked and the transmission input shaft 1, sun gear 17, ring gear 19, and electric motor 3 all rotate at the same speed. The second input shaft 12 is coupled to and rotates at the same speed as the transmission input shaft 1. Torque to power the output shaft 2 is provided by the engine 5. Power from the engine 5 may be supplemented by the electric motor 3 whenever desired. In one embodiment, the hybrid dual configuration transmission may be switched from FIXED ENGINE DRIVE-2ND GEAR operation to FIXED GEAR-2ND GEAR operation whenever additional torque to the output shaft 2 is required. Switching from FIXED ENGINE DRIVE-2ND GEAR operation to FIXED GEAR-2ND GEAR simply requires the activation of the first clutch mechanism 13. Deactivation of the first clutch mechanism 13 returns the hybrid dual configuration transmission to FIXED ENGINE DRIVE-2ND GEAR operation.

To be operate the hybrid dual configuration transmission in an electric variable transmission mode in a third gear (EVT-3RD GEAR), the third/reverse gear dog clutch 53 is moved into contact with the third driver gear 23, thereby, non-rotatably coupling the third driver gear 23 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, fifth driver gear 25, sixth driver gear 26, reverse driver gear 27, and output driven gear 41. Thus, the first driver gear 21, fifth driver gear 25, and reverse driver gear 27 are free to rotate with respect to the first input shaft 11, and the second driver gear 22, sixth driver gear 26, and output driven gear 41 are free to rotate with respect to the second input shaft 12. The first clutch mechanism 13 and second clutch mechanism 14 are deactivated. Thus, no clutch mechanism 13, 14 activation is required for propulsion in EVT-3RD GEAR. The ring gear 19 is free to rotate independently of the sun gear 17 and the second input shaft 12 is free to rotate independently of the transmission input shaft 1. Torque to power the output shaft 2 is provided by a combination of the engine 5 and the electric motor 3. In one embodiment, the one way clutch 4 provides a hill hold feature preventing a vehicle equipped with the hybrid dual configuration transmission from rolling backwards while still enabling the engine 5 to be started.

To operate the hybrid dual configuration transmission in fixed gear transmission mode in a third gear (FIXED GEAR-3RD GEAR), the third/reverse gear dog clutch 53 is moved into contact with the third driver gear 23, thereby, non-rotatably coupling the third driver gear 23 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, fifth driver gear 25, sixth driver gear 26, reverse driver gear 27, and output driven gear 41. Thus, the first driver gear 21, fifth driver gear 25, and reverse driver gear 27 are free to rotate with respect to the first input shaft 11, and the second driver gear 22, sixth driver gear 26, and output driven gear 41 are free to rotate with respect to the second input shaft 12. The first clutch mechanism 13 is activated and the second clutch mechanism 14 is deactivated. Thus, the power split planetary gear set 16 is locked and the transmission input shaft 1, sun gear 17, ring gear 19, and electric motor 3 all rotate at the same speed. The second input shaft 12 is free to rotate independently of the transmission input shaft 1. Torque to power the output shaft 2 is provided by a combination of the engine 5 and the electric motor 3. Power from the engine 5 may be supplemented by the electric motor 3 whenever desired. In one embodiment, the hybrid dual configuration transmission may be switched from EVT-3RD GEAR operation to FIXED GEAR-3RD GEAR operation whenever additional torque to the output shaft 2 is required. Switching from EVT-3RD GEAR operation to FIXED GEAR-3RD GEAR simply requires the activation of the first clutch mechanism 13. Deactivation of the first clutch mechanism 13 returns the hybrid dual configuration transmission to EVT-3RD GEAR operation.

To operate the hybrid dual configuration transmission in a fixed gear engine drive mode in a fourth gear (FIXED ENGINE DRIVE-4TH GEAR), the fourth gear dog clutch 54 is moved into contact with the output driven gear 41, thereby, non-rotatably coupling the output driven gear 41 to the second input shaft 12. The first/fifth gear dog clutch 51, second/sixth gear dog clutch 52, and third/reverse gear dog clutch 53 are kept out of contact with the first driver gear 21, second driver gear 22, third driver gear 23, fifth driver gear 25, sixth driver gear 26, and reverse driver gear 27. Thus, the first driver gear 21, third driver gear 23, fifth driver gear 25, and reverse driver gear 27 are free to rotate with respect to the first input shaft 11, and the second driver gear 22 and sixth driver gear 26 are free to rotate with respect to the second input shaft 12. The first clutch mechanism 13 is deactivated and the second clutch mechanism 14 is activated. Thus, the ring gear 19 is free to rotate independently of the sun gear 17. The second input shaft 12 is coupled to and rotates at the same speed as the transmission input shaft 1. Torque to power the output shaft 2 is provided by the engine 5.

To operate the hybrid dual configuration transmission in fixed gear transmission mode in a fourth gear (FIXED GEAR-4TH GEAR), the fourth gear dog clutch 54 is moved into contact with the output driven gear 41, thereby, non-rotatably coupling the output driven gear 41 to the second input shaft 12. The first/fifth gear dog clutch 51, second/sixth gear dog clutch 52, and third/reverse gear dog clutch 53 are kept out of contact with the first driver gear 21, second driver gear 22, third driver gear 23, fifth driver gear 25, sixth driver gear 26, and reverse driver gear 27. Thus, the first driver gear 21, third driver gear 23, fifth driver gear 25, and reverse driver gear 27 are free to rotate with respect to the first input shaft 11, and the second driver gear 22 and sixth driver gear 26 are free to rotate with respect to the second input shaft 12. The first clutch mechanism 13 and second clutch mechanism 14 are activated. Thus, the power split planetary gear set 16 is locked and the transmission input shaft 1, sun gear 17, ring gear 19, and electric motor 3 all rotate at the same speed. The second input shaft 12 is coupled to and rotates at the same speed as the transmission input shaft 1. Torque to power the output shaft 2 is provided by the engine 5. Power from the engine 5 may be supplemented by the electric motor 3 whenever desired. In one embodiment, the hybrid dual configuration transmission may be switched from FIXED ENGINE DRIVE-4TH GEAR operation to FIXED GEAR-4TH GEAR operation whenever additional torque to the output shaft 2 is required. Switching from FIXED ENGINE DRIVE-4TH GEAR operation to FIXED GEAR-4TH GEAR simply requires the activation of the first clutch mechanism 13. Deactivation of the first clutch mechanism 13 returns the hybrid dual configuration transmission to FIXED ENGINE DRIVE-4TH GEAR operation.

To be operate the hybrid dual configuration transmission in an electric variable transmission mode in a fifth gear (EVT-5TH GEAR), the first/fifth gear dog clutch 51 is moved into contact with the fifth driver gear 25, thereby, non-rotatably coupling the fifth driver gear 25 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, sixth driver gear 26, reverse driver gear 27, and output driven gear 41. Thus, the first driver gear 21, third driver gear 23, and reverse driver gear 27 are free to rotate with respect to the first input shaft 11, and the second driver gear 22, sixth driver gear 26, and output driven gear 41 are free to rotate with respect to the second input shaft 12. The first clutch mechanism 13 and second clutch mechanism 14 are deactivated. Thus, no clutch mechanism 13, 14 activation is required for propulsion in EVT-5TH GEAR. The ring gear 19 is free to rotate independently of the sun gear 17 and the second input shaft 12 is free to rotate independently of the transmission input shaft 1. Torque to power the output shaft 2 is provided by a combination of the engine 5 and the electric motor 3. In one embodiment, the one way clutch 4 provides a hill hold feature preventing a vehicle equipped with the hybrid dual configuration transmission from rolling backwards while still enabling the engine 5 to be started.

To operate the hybrid dual configuration transmission in fixed gear transmission mode in a fifth gear (FIXED GEAR-5TH GEAR), the first/fifth gear dog clutch 51 is moved into contact with the fifth driver gear 25, thereby, non-rotatably coupling the fifth driver gear 25 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, sixth driver gear 26, reverse driver gear 27, and output driven gear 41. Thus, the first driver gear 21, third driver gear 23, and reverse driver gear 27 are free to rotate with respect to the first input shaft 11, and the second driver gear 22, sixth driver gear 26, and output driven gear 41 are free to rotate with respect to the second input shaft 12. The first clutch mechanism 13 is activated and the second clutch mechanism 14 is deactivated. Thus, the power split planetary gear set 16 is locked and the transmission input shaft 1, sun gear 17, ring gear 19, and electric motor 3 all rotate at the same speed. The second input shaft 12 is free to rotate independently of the transmission input shaft 1. Torque to power the output shaft 2 is provided by a combination of the engine 5 and the electric motor 3. Power from the engine 5 may be supplemented by the electric motor 3 whenever desired. In one embodiment, the hybrid dual configuration transmission may be switched from EVT-5TH GEAR operation to FIXED GEAR-5TH GEAR operation whenever additional torque to the output shaft 2 is required. Switching from EVT-5TH GEAR operation to FIXED GEAR-5TH GEAR simply requires the activation of the first clutch mechanism 13. Deactivation of the first clutch mechanism 13 returns the hybrid dual configuration transmission to EVT-5TH GEAR operation.

To operate the hybrid dual configuration transmission in a fixed gear engine drive mode in a sixth gear (FIXED ENGINE DRIVE-6TH GEAR), the second/sixth gear dog clutch 52 is moved into contact with the sixth driver gear 26, thereby, non-rotatably coupling the sixth driver gear 26 to the second input shaft 12. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, fifth driver gear 25, reverse driver gear 27, and output driven gear 41. Thus, the first driver gear 21, third driver gear 23, fifth driver gear 25, and reverse driver gear 27 are free to rotate with respect to the first input shaft 11, and the second driver gear 22, and output driven gear 41 are free to rotate with respect to the second input shaft 12. The first clutch mechanism 13 is deactivated and the second clutch mechanism 14 is activated. Thus, the ring gear 19 is free to rotate independently of the sun gear 17. The second input shaft 12 is coupled to and rotates at the same speed as the transmission input shaft 1. Torque to power the output shaft 2 is provided by the engine 5.

To operate the hybrid dual configuration transmission in fixed gear transmission mode in a sixth gear (FIXED GEAR-6TH GEAR), the second/sixth gear dog clutch 52 is moved into contact with the sixth driver gear 26, thereby, non-rotatably coupling the sixth driver gear 26 to the second input shaft 12. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, fifth driver gear 25, reverse driver gear 27, and output driven gear 41. Thus, the first driver gear 21, third driver gear 23, fifth driver gear 25, and reverse driver gear 27 are free to rotate with respect to the first input shaft 11, and the second driver gear 22, and output driven gear 41 are free to rotate with respect to the second input shaft 12. The first clutch mechanism 13 and second clutch mechanism 14 are activated. Thus, the power split planetary gear set 16 is locked and the transmission input shaft 1, sun gear 17, ring gear 19, and electric motor 3 all rotate at the same speed. The second input shaft 12 is coupled to and rotates at the same speed as the transmission input shaft 1. Torque to power the output shaft 2 is provided by the engine 5. Power from the engine 5 may be supplemented by the electric motor 3 whenever desired. In one embodiment, the hybrid dual configuration transmission may be switched from FIXED ENGINE DRIVE-6TH GEAR operation to FIXED GEAR-6TH GEAR operation whenever additional torque to the output shaft 2 is required. Switching from FIXED ENGINE DRIVE-6TH GEAR operation to FIXED GEAR-6TH GEAR simply requires the activation of the first clutch mechanism 13. Deactivation of the first clutch mechanism 13 returns the hybrid dual configuration transmission to FIXED ENGINE DRIVE-6TH GEAR operation.

To be operate the hybrid dual configuration transmission in an electric variable transmission mode in a reverse gear (EVT-REVERSE GEAR), the third/reverse gear dog clutch 53 is moved into contact with the reverse driver gear 27, thereby, non-rotatably coupling the reverse driver gear 27 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, fifth driver gear 25, sixth driver gear 26, and output driven gear 41. Thus, the first driver gear 21, third driver gear 23, and fifth driver gear 25 are free to rotate with respect to the first input shaft 11, and the second driver gear 22, sixth driver gear 26, and output driven gear 41 are free to rotate with respect to the second input shaft 12. The first clutch mechanism 13 and second clutch mechanism 14 are deactivated. Thus, no clutch mechanism 13, 14 activation is required for propulsion in EVT-REVERSE GEAR. The ring gear 19 is free to rotate independently of the sun gear 17 and the second input shaft 12 is free to rotate independently of the transmission input shaft 1. Torque to power the output shaft 2 is provided by a combination of the engine 5 and the electric motor 3.

To operate the hybrid dual configuration transmission in fixed gear transmission mode in a reverse gear (FIXED GEAR-REVERSE GEAR), the third/reverse gear dog clutch 53 is moved into contact with the reverse driver gear 27, thereby, non-rotatably coupling the reverse driver gear 27 to the first input shaft 11. The first/fifth gear dog clutch 51, second/sixth gear dog clutch 52, third/reverse gear dog clutch 53, and fourth gear dog clutch 54 are kept out of contact with the first driver gear 21, second driver gear 22, third driver gear 23, fifth driver gear 25, sixth driver gear 26, and output driven gear 41. Thus, the first driver gear 21, third driver gear 23, and fifth driver gear 25 are free to rotate with respect to the first input shaft 11, and the second driver gear 22, sixth driver gear 26, and output driven gear 41 are free to rotate with respect to the second input shaft 12. The first clutch mechanism 13 is activated and the second clutch mechanism 14 is deactivated. Thus, the power split planetary gear set 16 is locked and the transmission input shaft 1, sun gear 17, ring gear 19, and electric motor 3 all rotate at the same speed. The second input shaft 12 is free to rotate independently of the transmission input shaft 1. Torque to power the output shaft 2 is provided by a combination of the engine 5 and the electric motor 3. Power from the engine 5 may be supplemented by the electric motor 3 whenever desired. In one embodiment, the hybrid dual configuration transmission may be switched from EVT-REVERSE GEAR operation to FIXED GEAR-REVERSE GEAR operation whenever additional torque to the output shaft 2 is required. Switching from EVT-REVERSE GEAR operation to FIXED GEAR-REVERSE GEAR simply requires the activation of the first clutch mechanism 13. Deactivation of the first clutch mechanism 13 returns the hybrid dual configuration transmission to EVT-REVERSE GEAR operation.

In one embodiment, the hybrid dual configuration transmission may be operated with multiple driver gears 21, 22, 23, 25, 26, 41 engaged at the same time. Operation in this manner is particularly desirable to smooth shifts between different operation modes. To shift from operation in which torque is transferred through the first driver gear 21 (EVT-1ST GEAR, FIXED GEAR-1ST GEAR) to operation in which torque is transferred through the second driver gear 22 (FIXED ENGINE DRIVE-2ND GEAR, FIXED GEAR-2ND GEAR), the first clutch mechanism 13 must be deactivated, thereby, placing the hybrid dual configuration transmission in EVT-1ST GEAR mode. The second/sixth gear dog clutch 52 is moved into contact with the second driver gear 22. Subsequently, the engine 5 and electric motor 3 are powered to adjust the speed of the ring gear 19 to match the speed of the second input shaft 12. In one embodiment the engine 5 and electric motor 3 are powered to adjust the speed of the ring gear 19 to match the speed of the second input shaft 12 prior to contact between the second/sixth gear dog clutch 52 and second driver gear 22. In one embodiment the engine 5 and electric motor 3 are powered to adjust the speed of the ring gear 19 to match the speed of the second input shaft 12 simultaneously with contact between the second/sixth gear dog clutch 52 and second driver gear 22. The second clutch mechanism 14 is then activated. At this point during the shift process, both the first driver gear 21 and second driver gear 22 are engaged and transmitting torque to the output shaft 2. The transmission can be operated in this transition state with both the first driver gear 21 and second driver gear 22 transmitting torque to the output shaft 2. To complete the shift to operation in which torque is transferred through the second driver gear 22 (FIXED ENGINE DRIVE-2ND GEAR, FIXED GEAR-2ND GEAR), the first/fifth gear dog clutch 51 is moved out of contact with the first driver gear 21.

To shift from operation in which torque is transferred through the second driver gear 22 (FIXED ENGINE DRIVE-2ND GEAR, FIXED GEAR-2ND GEAR) to operation in which torque is transferred through the third driver gear 23 (EVT-3RD GEAR, FIXED GEAR-3RD GEAR), the first clutch mechanism 13 must be deactivated, thereby, placing the hybrid dual configuration transmission in FIXED ENGINE DRIVE-2ND GEAR. The third/reverse gear dog clutch 53 is moved into contact with the third driver gear 23. At this point during the shift process, both the second driver gear 22 and third driver gear 23 are engaged and transmitting torque to the output shaft 2. The transmission can be operated in this transition state with both the second driver gear 22 and third driver gear 23 transmitting torque to the output shaft 2. To complete the shift to operation in which torque is transferred through the third driver gear 23 (EVT-3RD GEAR, FIXED GEAR-3RD GEAR), the second clutch mechanism 14 is deactivated. Prior to shifting to operation in which torque is transferred through the sixth driver gear 26 (FIXED ENGINE DRIVE-6TH GEAR, FIXED GEAR-6TH GEAR) or output driven gear 41 (FIXED ENGINE DRIVE-4TH GEAR, FIXED GEAR-4TH GEAR), the second/sixth gear dog clutch 52 must be moved out of contact with the second driver gear 22.

To shift from operation in which torque is transferred through the third driver gear 23 (EVT-3RD GEAR, FIXED GEAR-3RD GEAR) to operation in which torque is transferred through the output driven gear 41 (FIXED ENGINE DRIVE-4TH GEAR, FIXED GEAR-4TH GEAR), the first clutch mechanism 13 must be deactivated, thereby, placing the hybrid dual configuration transmission in EVT-3RD GEAR mode. The fourth gear dog clutch 54 is moved into contact with the output driven gear 41. Subsequently, the engine 5 and electric motor 3 are powered to adjust the speed of the ring gear 19 to match the speed of the second input shaft 12. In one embodiment the engine 5 and electric motor 3 are powered to adjust the speed of the ring gear 19 to match the speed of the second input shaft 12 prior to contact between the fourth gear dog clutch 54 and output driven gear 41. In one embodiment the engine 5 and electric motor 3 are powered to adjust the speed of the ring gear 19 to match the speed of the second input shaft 12 simultaneously with contact between the fourth gear dog clutch 54 and output driven gear 41. The second clutch mechanism 14 is then activated. At this point during the shift process, both the third driver gear 23 and output driven gear 41 are engaged and transmitting torque to the output shaft 2. The transmission can be operated in this transition state with both the third driver gear 23 and output driven gear 41 transmitting torque to the output shaft 2. To complete the shift to operation in which torque is transferred through the output driven gear 41 (FIXED ENGINE DRIVE-4TH GEAR, FIXED GEAR-4TH GEAR), the third/reverse gear dog clutch 53 is moved out of contact with the third driver gear 23.

To shift from operation in which torque is transferred through the output driven gear 41 (FIXED ENGINE DRIVE-4TH GEAR, FIXED GEAR-4TH GEAR) to operation in which torque is transferred through the fifth driver gear 25 (EVT-5TH GEAR, FIXED GEAR-5TH GEAR), the first clutch mechanism 13 must be deactivated, thereby, placing the hybrid dual configuration transmission in FIXED ENGINE DRIVE-4TH GEAR. The first/fifth gear dog clutch 51 is moved into contact with the fifth driver gear 25. At this point during the shift process, both the output driven gear 41 and fifth driver gear 25 are engaged and transmitting torque to the output shaft 2. The transmission can be operated in this transition state with both the output driven gear 41 and fifth driver gear 25 transmitting torque to the output shaft 2. To complete the shift to operation in which torque is transferred through the fifth driver gear 25 (EVT-5TH GEAR, FIXED GEAR-5TH GEAR), the second clutch mechanism 14 is deactivated. Prior to shifting to operation in which torque is transferred through the second driver gear 22 (FIXED ENGINE DRIVE-2ND GEAR, FIXED GEAR-2ND GEAR) or sixth driver gear 26 (FIXED ENGINE DRIVE-6TH GEAR, FIXED GEAR-6TH GEAR), the fourth gear dog clutch 54 must be moved out of contact with the output driven gear 41.

To shift from operation in which torque is transferred through the fifth driver gear 25 (EVT-5TH GEAR, FIXED GEAR-5TH GEAR) to operation in which torque is transferred through the sixth driver gear 26 (FIXED ENGINE DRIVE-6TH GEAR, FIXED GEAR-6TH GEAR), the first clutch mechanism 13 must be deactivated, thereby, placing the hybrid dual configuration transmission in EVT-5TH GEAR mode. The second/sixth gear dog clutch 52 is moved into contact with the sixth driver gear 26. Subsequently, the engine 5 and electric motor 3 are powered to adjust the speed of the ring gear 19 to match the speed of the second input shaft 12. In one embodiment the engine 5 and electric motor 3 are powered to adjust the speed of the ring gear 19 to match the speed of the second input shaft 12 prior to contact between the second/sixth gear dog clutch 52 and sixth driver gear 26. In one embodiment the engine 5 and electric motor 3 are powered to adjust the speed of the ring gear 19 to match the speed of the second input shaft 12 simultaneously with contact between the second/sixth gear dog clutch 52 and sixth driver gear 26. The second clutch mechanism 14 is then activated. At this point during the shift process, both the fifth driver gear 25 and sixth driver gear 26 are engaged and transmitting torque to the output shaft 2. The transmission can be operated in this transition state with both the fifth driver gear 25 and sixth driver gear 26 transmitting torque to the output shaft 2. To complete the shift to operation in which torque is transferred through the sixth driver gear 26 (FIXED ENGINE DRIVE-6TH GEAR, FIXED GEAR-6TH GEAR), the first/fifth gear dog clutch 51 is moved out of contact with the first driver gear 21.

Figure 3:
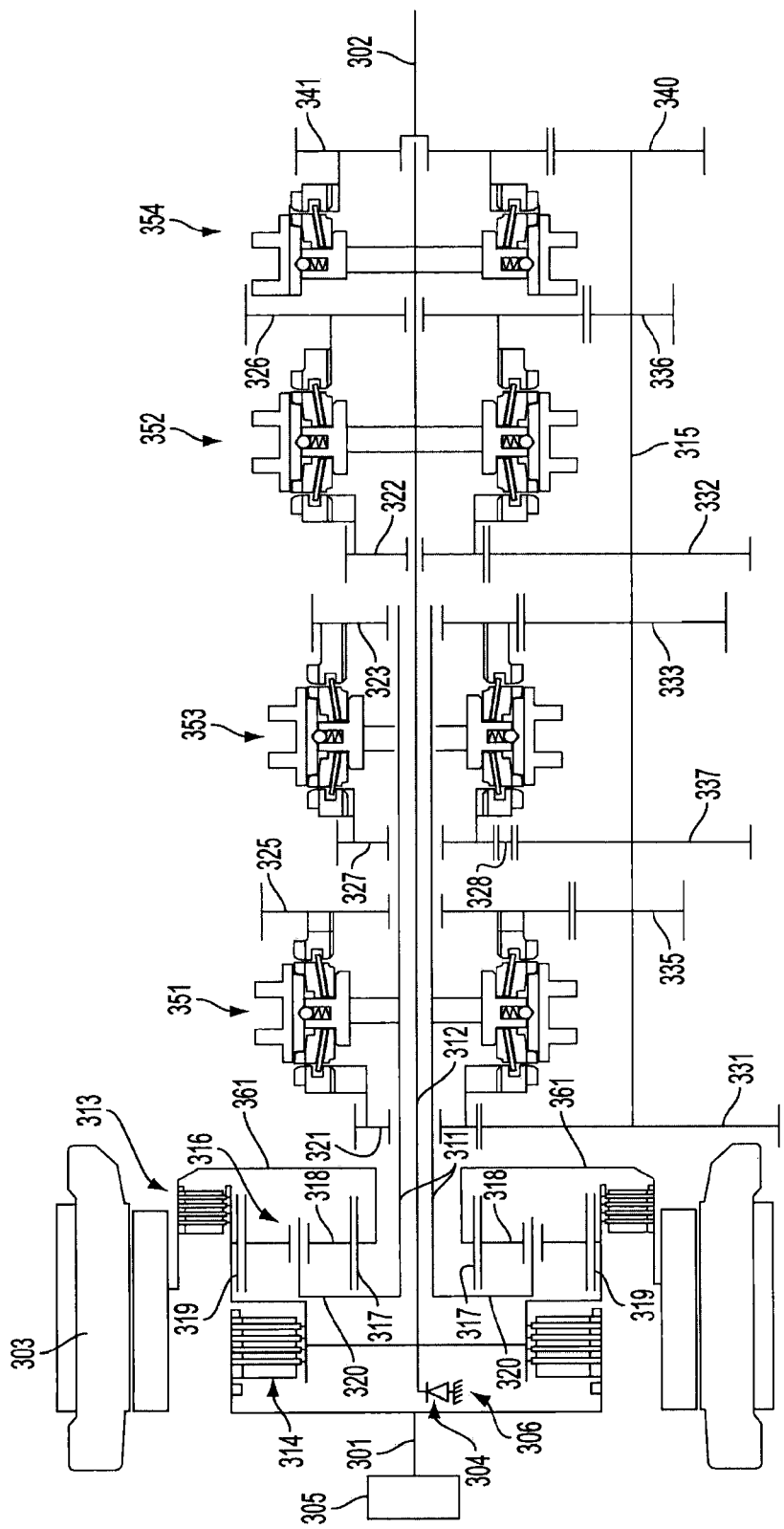
FIG. 3 is a schematic representation of an exemplary hybrid dual configuration transmission according to another embodiment described herein.

FIG. 3 illustrates an example schematic representation of an exemplary hybrid dual configuration transmission according another embodiment of the present disclosure. The transmission includes a transmission input shaft 301 by which torque may be introduced into the transmission. The transmission input shaft 301 may be coupled to an engine 305 or any other torque source. The transmission input shaft 301 is also coupled to a second clutch mechanism 314. The second clutch mechanism 314 selectively couples the transmission input shaft 301 to a second input shaft 312 through a one way clutch 304. The one way clutch 304 permits the second input shaft 312 to rotate with respect to the transmission housing 306 in a first direction, but prevents rotation of the second input shaft 312 in the opposite direction. In one embodiment, the one way clutch 304 may be on the output shaft 302 side of the second clutch mechanism 314. In one embodiment, the one way clutch 304 may be on the engine 305 side of the second clutch mechanism 314. The first input shaft 311 is concentric with and, in one embodiment, surrounds a portion of the second input shaft 312. Activation of the second clutch mechanism 314 non-rotatably couples the transmission input shaft 301 to the second input shaft 312, thereby, causing the transmission input shaft 301 and second input shaft 312 to rotate at the same speed. The second clutch mechanism also selectively couples the transmission input shaft 301 to a ring gear 319 of a power split planetary gear set 316 and a first clutch mechanism 313. The second input shaft 312 and ring gear 319 are coupled together and rotate at the same speed. Activation of the second clutch mechanism 314 non-rotatably couples the transmission input shaft 301 to the second input shaft 312 and ring gear 319, thereby, causing the transmission input shaft 301 to rotate at the same speed as the second input shaft 312 and ring gear 319.

The first clutch mechanism 313 selectively couples the ring gear 319 via a shaft 361 to a sun gear 317 of the power split planetary gear set 316. Pinion gears 318 of the power split planetary gear set 316 are continuously meshed with the sun gear 317 and ring gear 319. The pinion gears 318 are rotatably mounted on a carrier 320 of the power split planetary gear set 316. The carrier 320 is coupled to a first input shaft 311. Activation of the first clutch mechanism 313 non-rotatably couples the sun gear 317 to the ring gear 319, thereby, locking together the power split planetary gear set 316 causing the sun gear 317, ring gear 319, and carrier 320 to rotate at the same speed. Shaft 361 also couples an electric motor 303 to the sun gear 317.

The first input shaft 311 includes a plurality of rotatably attached gears 321, 323, 325, 327 capable of rotating independently of the first input shaft 311. The plurality of gears 321, 323, 325, 327 rotatably attached to the first input shaft 311 include a first driver gear 321, third driver gear 323, fifth driver gear 325, and reverse driver gear 327. A plurality of gears 322, 326 are rotatably attached to the second input shaft 312 and are capable of rotating independently of the second input shaft 311. The plurality of gears 322, 326 rotatably attached to the second input shaft 312 include a second driver gear 322 and sixth driver gear 326. An output driven gear 341 is non-rotatably coupled to the output shaft 302 by which torque is transmitted out of the transmission.

The transmission also includes a layshaft 315 parallel to the first input shaft 311 and second input shaft 312. The layshaft 315 includes a plurality of fixedly attached gears 331, 332, 333, 335, 336, 337, 340. The fixedly attached gears 331, 332, 333, 335, 336, 337, 340 rotate at the same angular velocity as the layshaft 315. The fixedly attached gears 331, 332, 333, 335, 336, 337, 340 include a first driven gear 331, second driven gear 332, third driven gear 333, fifth driven gear 335, sixth driven gear 336, reverse driven gear 337, and output driver gear 340.

Respective gears on the first input shaft 311, second input shaft 312, and layshaft 315 are continually meshed with one another. In particular, the first driver gear 321 is continuously meshed with the first driven gear 331, the second driver gear 322 is continuously meshed with the second driven gear 332, the third driver gear 323 is continuously meshed with the third driven gear 333, the fifth driver gear 325 is continuously meshed with the fifth driven gear 335, and the sixth driver gear 326 is continuously meshed with the sixth driven gear 336. The output driver gear 340 is continuously meshed with the output driven gear 341. The reverse driver gear 327 is continuously meshed with a reverse idler gear 328. The reverse idler gear 328 is also continuously meshed with the reverse driven gear 337.

The first input shaft 311 and second input shaft 312 also include a plurality of synchronizer mechanisms (e.g., dog clutches) 351, 352, 353, 354 to selectively lock a rotatably attached gear 321, 322, 323, 325, 326, 327, 341 to its respective first input shaft 311 or second input shaft 312. The first/fifth gear dog clutch 351 and third/reverse gear dog clutch 353 are non-rotatably coupled to the first input shaft 311. The second/sixth gear dog clutch 352 and fourth gear dog clutch 354 are non-rotatably coupled to the second input shaft 312. A first/fifth gear dog clutch 351 is attached to the first input shaft 311 between the first driver gear 321 and fifth driver gear 325. The first/fifth gear dog clutch 351 may be moved axially along the first input shaft 311 in the direction of the first driver gear 321 or moved axially along the first input shaft 311 in the opposite direction towards the fifth driver gear 325. A second/sixth gear dog clutch 352 is attached to the second input shaft 312 between the second driver gear 322 and sixth driver gear 326. The second/sixth gear dog clutch 352 may be moved axially along the second input shaft 312 in the direction of the second driver gear 322 or moved axially along the second input shaft 312 in the opposite direction towards the sixth driver gear 326. A third/reverse gear dog clutch 353 is attached to the first input shaft 311 between the third driver gear 323 and reverse driver gear 327. The third/reverse gear dog clutch 353 may be moved axially along the first input shaft 311 in the direction of the third driver gear 323 or moved axially along the first input shaft 311 in the opposite direction towards the reverse driver gear 327. A fourth gear dog clutch 354 is attached to the second input shaft 312 adjacent to the output driven gear 341. The fourth gear dog clutch 354 may be moved axially along the second input shaft 312 towards or away from the output driven gear 341.

Each of the synchronizer mechanisms 351, 352, 353, 354 may be moved axially along its respective first input shaft 311 or second input shaft 312 to contact one of the rotatably attached gears 321, 322, 323, 325, 326, 327, 341. Contact between one of the synchronizer mechanisms 351, 352, 353, 354 and a corresponding rotatably attached gear 321, 322, 323, 325, 326, 327, 341 keys the rotatably attached gear 321, 322, 323, 325, 326, 327, 341 to its corresponding synchronizer mechanism 351, 352, 353, 354 and, accordingly, to its respective first input shaft 311 or second input shaft 312. Thus, contact between the synchronizer mechanism 351, 352, 353, 354 and its respective gear 321, 322, 323, 325, 326, 327, 341 non-rotatably couples the gear 321, 322, 323, 325, 326, 327, 341 to its respective input shaft 311, 312 such that the gear 321, 322, 323, 325, 326, 327, 341 rotates at the same speed as its respective input shaft 311, 312.

FIG. 4 is a table showing example operating modes of the hybrid dual configuration transmission of FIG. 3. The transmission of FIG. 3 may be operated as a purely electric transmission (EV, EV-ENGINE START, EV-1ST GEAR, EV-2ND GEAR, EV-3RD GEAR, EV-4TH GEAR, EV-5TH GEAR, EV-6TH GEAR, EV-REVERSE GEAR), an electrically variable transmission (EVT-1ST GEAR, EVT-3RD GEAR, EVT-5TH GEAR, EVT-REVERSE GEAR), and in a fixed gear ratio using any combination of torque from the electric motor 303 and the engine 305 (FIXED GEAR-1ST GEAR, FIXED GEAR-2ND GEAR, FIXED GEAR-3RD GEAR, FIXED GEAR-4TH GEAR, FIXED GEAR-5TH GEAR, FIXED GEAR-6TH GEAR, FIXED GEAR-REVERSE GEAR). The first clutch mechanism 313 (shown as "C1"), second clutch mechanism 314 (shown as "C2"), first/fifth gear dog clutch 351, second/sixth gear dog clutch 352, third/reverse gear dog clutch 353, and fourth gear dog clutch 354, may be selectively activated to achieve the different operating states of the hybrid dual configuration transmission.

With reference to FIGS. 3 and 4, when the hybrid dual configuration transmission is to be operated as a purely electric transmission (EV), the first clutch mechanism 313 and second clutch mechanism 314 are deactivated. Thus, no clutch mechanism 313, 314 activation is required for propulsion in EV mode. Propulsion may be provided even when there is insufficient transmission hydraulic pressure to power the first clutch mechanism 313 and second clutch mechanism 314. This enables faster vehicle start-up and shortens the time from start-up to vehicle movement. The second/sixth gear dog clutch 352 is moved into contact with the second driver gear 322, thereby, non-rotatably coupling the second driver gear 322 to the second input shaft 312. Simultaneously, the third/reverse gear dog clutch 353 is moved into contact with the reverse driver gear 327, thereby, non-rotatably coupling the reverse driver gear 327 to the first input shaft 311. The first/fifth gear dog clutch 351, second/sixth gear dog clutch 352, third/reverse gear dog clutch 353, and fourth gear dog clutch 354 are kept out of contact with the first driver gear 321, third driver gear 323, fifth driver gear 325, sixth driver gear 326, and output driven gear 341. Thus, the first driver gear 321, third driver gear 323, and fifth driver gear 325 are free to rotate with respect to the first input shaft 311, and the sixth driver gear 326 and output driven gear 341 are free to rotate with respect to the second input shaft 312. Torque to power the output shaft 302 is provided by the electric motor 303. To start the engine 305, (EV (ENGINE START)), the second clutch mechanism 314 is activated, thereby, coupling the transmission input shaft 301 to the ring gear 319 and second input shaft 312. The application pressure of the second clutch mechanism 314 may be modulated to ensure a smooth engine 305 start and minimize or eliminate any transmission jolt associated with the engine 305 start. Once the engine 305 is started, propulsion may be provided by a combination of engine 305 and electric motor 303 power or the hybrid dual configuration transmission may be switched into a different mode.

To operate the hybrid dual configuration transmission in an electric transmission mode in a first gear (EV-1ST GEAR), the first/fifth gear dog clutch 351 is moved into contact with the first driver gear 321, thereby, non-rotatably coupling the first driver gear 321 to the first input shaft 311. The first/fifth gear dog clutch 351, second/sixth gear dog clutch 352, third/reverse gear dog clutch 353, and fourth gear dog clutch 354 are kept out of contact with the second driver gear 322, third driver gear 323, fifth driver gear 325, sixth driver gear 326, reverse driver gear 327, and output driven gear 341. Thus, the third driver gear 323, fifth driver gear 325, and reverse driver gear 327 are free to rotate with respect to the first input shaft 311, and the second driver gear 322 and sixth driver gear 326, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To operate the hybrid dual configuration transmission in an electric variable transmission mode in a first gear (EVT-1ST GEAR), the first/fifth gear dog clutch 351 is moved into contact with the first driver gear 321, thereby, non-rotatably coupling the first driver gear 321 to the first input shaft 311. The first/fifth gear dog clutch 351, second/sixth gear dog clutch 352, third/reverse gear dog clutch 353, and fourth gear dog clutch 354 are kept out of contact with the second driver gear 322, third driver gear 323, fifth driver gear 325, sixth driver gear 326, reverse driver gear 327, and output driven gear 341. Thus, the third driver gear 323, fifth driver gear 325, and reverse driver gear 327 are free to rotate with respect to the first input shaft 311, and the second driver gear 322 and sixth driver gear 326, and output driven gear 341 are free to rotate with respect to the second input shaft 312. The first clutch mechanism 313 is deactivated and the second clutch mechanism 314 is activated. The ring gear 319 is free to rotate independently of the sun gear 317. The second input shaft 312, ring gear 319, and transmission input shaft 301 are coupled together and rotate synchronously. Torque to power the output shaft 302 is provided by a combination of the engine 305 and the electric motor 303. In one embodiment, the one way clutch 304 provides a hill hold feature preventing a vehicle equipped with the hybrid dual configuration transmission from rolling backwards while still enabling the engine 305 to be started.

To operate the hybrid dual configuration transmission in fixed gear transmission mode in a first gear (FIXED GEAR-1ST GEAR), the first/fifth gear dog clutch 351 is moved into contact with the first driver gear 321, thereby, non-rotatably coupling the first driver gear 321 to the first input shaft 311. The first/fifth gear dog clutch 351, second/sixth gear dog clutch 352, third/reverse gear dog clutch 353, and fourth gear dog clutch 354 are kept out of contact with the second driver gear 322, third driver gear 323, fifth driver gear 325, sixth driver gear 326, reverse driver gear 327, and output driven gear 341. Thus, the third driver gear 323, fifth driver gear 325, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303, and second input shaft 312 all rotate at the same speed. Torque to power the output shaft 302 is provided by a combination of the engine 305 and the electric motor 303. Power from the engine 305 may be supplemented by the electric motor 303 whenever desired. In one embodiment, the hybrid dual configuration transmission may be switched from EVT-1ST GEAR operation to FIXED GEAR-1ST GEAR operation whenever additional torque to the output shaft 2 is required. Switching from EVT-1ST GEAR operation to FIXED GEAR-1ST GEAR simply requires the activation of the first clutch mechanism 13. Deactivation of the first clutch mechanism 13 returns the hybrid dual configuration transmission to EVT-1ST GEAR operation.

To operate the hybrid dual configuration transmission in an electric transmission mode in a second gear (EV-2ND GEAR), the second/sixth gear dog clutch 352 is moved into contact with the second driver gear 322, thereby, non-rotatably coupling the second driver gear 322 to the second input shaft 312. The first/fifth gear dog clutch 351, second/sixth gear dog clutch 352, third/reverse gear dog clutch 353, and fourth gear dog clutch 354 are kept out of contact with the first driver gear 321, third driver gear 323, fifth driver gear 325, sixth driver gear 326, reverse driver gear 327, and output driven gear 341. Thus, the first driver gear 321, third driver gear 323, fifth driver gear 325, and reverse driver gear 327 are free to rotate with respect to the first input shaft 311, and the sixth driver gear 326, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To operate the hybrid dual configuration transmission in fixed gear transmission mode in a second gear (FIXED GEAR-2ND GEAR), the second/sixth gear dog clutch 352 is moved into contact with the second driver gear 322, thereby, non-rotatably coupling the second driver gear 322 to the second input shaft 312. The first/fifth gear dog clutch 351, second/sixth gear dog clutch 352, third/reverse gear dog clutch 353, and fourth gear dog clutch 354 are kept out of contact with the first driver gear 321, third driver gear 323, fifth driver gear 325, sixth driver gear 326, reverse driver gear 327, and output driven gear 341. Thus, the first driver gear 321, third driver gear 323, fifth driver gear 325, and reverse driver gear 327 are free to rotate with respect to the first input shaft 311, and the sixth driver gear 326, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303 and second input shaft 312 all rotate at the same speed. Torque to power the output shaft 302 is provided by the engine 305. Power from the engine 305 may be supplemented by the electric motor 303 whenever desired.

To operate the hybrid dual configuration transmission in an electric transmission mode in a third gear (EV-3RD GEAR), the third/reverse gear dog clutch 353 is moved into contact with the third driver gear 323, thereby, non-rotatably coupling the third driver gear 323 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, fifth driver gear 325, sixth driver gear 326, reverse driver gear 327, and output driven gear 341. Thus, the first driver gear 321, fifth driver gear 325, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To be operate the hybrid dual configuration transmission in an electric variable transmission mode in a third gear (EVT-3RD GEAR), the third/reverse gear dog clutch 353 is moved into contact with the third driver gear 323, thereby, non-rotatably coupling the third driver gear 323 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, fifth driver gear 325, sixth driver gear 326, reverse driver gear 327, and output driven gear 341. Thus, the first driver gear 321, fifth driver gear 325, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 is deactivated and second clutch mechanism 314 is activated. The ring gear 319 is free to rotate independently of the sun gear 317. The second input shaft 312, sun gear 319, and transmission input shaft 301 are coupled together and rotate synchronously. Torque to power the output shaft 302 is provided by a combination of the engine 305 and the electric motor 303. In one embodiment, the one way clutch 304 provides a hill hold feature preventing a vehicle equipped with the hybrid dual configuration transmission from rolling backwards while still enabling the engine 305 to be started.

To operate the hybrid dual configuration transmission in fixed gear transmission mode in a third gear (FIXED GEAR-3RD GEAR), the third/reverse gear dog clutch 353 is moved into contact with the third driver gear 323, thereby, non-rotatably coupling the third driver gear 323 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, fifth driver gear 325, sixth driver gear 326, reverse driver gear 327, and output driven gear 341. Thus, the first driver gear 321, fifth driver gear 325, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303, and second input shaft 312 all rotate at the same speed. Torque to power the output shaft 302 is provided by a combination of the engine 305 and the electric motor 303. Power from the engine 305 may be supplemented by the electric motor 303 whenever desired. In one embodiment, the hybrid dual configuration transmission may be switched from EVT-3RD GEAR operation to FIXED GEAR-3RD GEAR operation whenever additional torque to the output shaft 302 is required. Switching from EVT-3RD GEAR operation to FIXED GEAR-3RD GEAR simply requires the activation of the first clutch mechanism 313. Deactivation of the first clutch mechanism 313 returns the hybrid dual configuration transmission to EVT-3RD GEAR operation.

To operate the hybrid dual configuration transmission in an electric transmission mode in a fourth gear (EV-4TH GEAR), the fourth gear dog clutch 354 is moved into contact with the output driven gear 341, thereby, non-rotatably coupling the output driven gear 341 to the second input shaft 312. The first/fifth gear dog clutch 351, second/sixth gear dog clutch 352, and third/reverse gear dog clutch 353 are kept out of contact with the first driver gear 321, second driver gear 322, third driver gear 323, fifth driver gear 325, sixth driver gear 326, and reverse driver gear 327. Thus, the first driver gear 321, third driver gear 323, fifth driver gear 325, and reverse driver gear 327 are free to rotate with respect to the first input shaft 311, and the second driver gear 322 and sixth driver gear 326 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To operate the hybrid dual configuration transmission in fixed gear transmission mode in a fourth gear (FIXED GEAR-4TH GEAR), the fourth gear dog clutch 354 is moved into contact with the output driven gear 341, thereby, non-rotatably coupling the output driven gear 341 to the second input shaft 312. The first/fifth gear dog clutch 351, second/sixth gear dog clutch 352, and third/reverse gear dog clutch 353 are kept out of contact with the first driver gear 321, second driver gear 322, third driver gear 323, fifth driver gear 325, sixth driver gear 326, and reverse driver gear 327. Thus, the first driver gear 321, third driver gear 323, fifth driver gear 325, and reverse driver gear 327 are free to rotate with respect to the first input shaft 311, and the second driver gear 322 and sixth driver gear 326 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, and electric motor 303 all rotate at the same speed. The second input shaft 312 is coupled to and rotates at the same speed as the transmission input shaft 301. Torque to power the output shaft 302 is provided by the engine 305. Power from the engine 305 may be supplemented by the electric motor 303 whenever desired.

To operate the hybrid dual configuration transmission in an electric transmission mode in a fifth gear (EV-5TH GEAR), the first/fifth gear dog clutch 351 is moved into contact with the fifth driver gear 325, thereby, non-rotatably coupling the fifth driver gear 325 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, sixth driver gear 326, reverse driver gear 327, and output driven gear 341. Thus, the first driver gear 321, third driver gear 323, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To be operate the hybrid dual configuration transmission in an electric variable transmission mode in a fifth gear (EVT-5TH GEAR), the first/fifth gear dog clutch 351 is moved into contact with the fifth driver gear 325, thereby, non-rotatably coupling the fifth driver gear 325 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, sixth driver gear 326, reverse driver gear 327, and output driven gear 341. Thus, the first driver gear 321, third driver gear 323, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 is deactivated and second clutch mechanism 314 is activated. The ring gear 319 is free to rotate independently of the sun gear 317. The second input shaft 312, sun gear 319, and transmission input shaft 301 are coupled together and rotate synchronously. Torque to power the output shaft 302 is provided by a combination of the engine 305 and the electric motor 303. In one embodiment, the one way clutch 304 provides a hill hold feature preventing a vehicle equipped with the hybrid dual configuration transmission from rolling backwards while still enabling the engine 305 to be started.

To operate the hybrid dual configuration transmission in fixed gear transmission mode in a fifth gear (FIXED GEAR-5TH GEAR), the first/fifth gear dog clutch 351 is moved into contact with the fifth driver gear 325, thereby, non-rotatably coupling the fifth driver gear 325 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, sixth driver gear 326, reverse driver gear 327, and output driven gear 341. Thus, the first driver gear 321, third driver gear 323, and reverse driver gear 327 are free to rotate with respect to the first input shaft 311, and the second driver gear 322, sixth driver gear 326, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303, and second input shaft 312 all rotate at the same speed. Torque to power the output shaft 302 is provided by a combination of the engine 305 and the electric motor 303. Power from the engine 305 may be supplemented by the electric motor 303 whenever desired. In one embodiment, the hybrid dual configuration transmission may be switched from EVT-5TH GEAR operation to FIXED GEAR-5TH GEAR operation whenever additional torque to the output shaft 302 is required. Switching from EVT-5TH GEAR operation to FIXED GEAR-5TH GEAR simply requires the activation of the first clutch mechanism 313. Deactivation of the first clutch mechanism 313 returns the hybrid dual configuration transmission to EVT-5TH GEAR operation.

To operate the hybrid dual configuration transmission in an electric transmission mode in a sixth gear (EV-6TH GEAR), the second/sixth gear dog clutch 352 is moved into contact with the sixth driver gear 326, thereby, non-rotatably coupling the sixth driver gear 326 to the second input shaft 312. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, fifth driver gear 325, reverse driver gear 327, and output driven gear 341. Thus, the first driver gear 321, third driver gear 323, fifth driver gear 325, and reverse driver gear 327 are free to rotate with respect to the first input shaft 311, and the second driver gear 322, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To operate the hybrid dual configuration transmission in fixed gear transmission mode in a sixth gear (FIXED GEAR-6TH GEAR), the second/sixth gear dog clutch 352 is moved into contact with the sixth driver gear 326, thereby, non-rotatably coupling the sixth driver gear 326 to the second input shaft 312. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, fifth driver gear 325, reverse driver gear 327, and output driven gear 341. Thus, the first driver gear 321, third driver gear 323, fifth driver gear 325, and reverse driver gear 327 are free to rotate with respect to the first input shaft 311, and the second driver gear 322, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303, and second input shaft 312 all rotate at the same speed. Torque to power the output shaft 302 is provided by the engine 305. Power from the engine 305 may be supplemented by the electric motor 303 whenever desired.

To operate the hybrid dual configuration transmission in an electric transmission mode in a reverse gear (EV-REVERSE GEAR), the third/reverse gear dog clutch 353 is moved into contact with the reverse driver gear 327, thereby, non-rotatably coupling the reverse driver gear 327 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, fifth driver gear 325, sixth driver gear 326, and output driven gear 341. Thus, the first driver gear 321, third driver gear 323, and fifth driver gear 325 are free to rotate with respect to the first input shaft 311, and the second driver gear 322, sixth driver gear 326, and output driven gear 341 are free to rotate with respect to the second input shaft 312. The first clutch mechanism 313 is activated and the second clutch mechanism 314 is deactivated. Thus, the power split planetary gear set 316 is locked and the sun gear 317, ring gear 319, and electric motor 303 all rotate at the same speed. The second input shaft 312, sun gear 317, ring gear 319, and electric motor 303 are free to rotate independently of the transmission input shaft 301. Torque to power the output shaft 302 is provided by the electric motor 303.

To operate the hybrid dual configuration transmission in an electric variable transmission mode in a reverse gear (EVT-REVERSE GEAR), the third/reverse gear dog clutch 353 is moved into contact with the reverse driver gear 327, thereby, non-rotatably coupling the reverse driver gear 327 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, fifth driver gear 325, sixth driver gear 326, and output driven gear 341. Thus, the first driver gear 321, third driver gear 323, and fifth driver gear 325 are free to rotate with respect to the first input shaft 311, and the second driver gear 322, sixth driver gear 326, and output driven gear 341 are free to rotate with respect to the second input shaft 312. The first clutch mechanism 313 is deactivated and the second clutch mechanism 314 is activated. The ring gear 319 is free to rotate independently of the sun gear 317. The second input shaft 312, sun gear 319, and transmission input shaft 301 are coupled together and rotate synchronously. Torque to power the output shaft 302 is provided by a combination of the engine 305 and the electric motor 303.

To operate the hybrid dual configuration transmission in fixed gear transmission mode in a reverse gear (FIXED GEAR-REVERSE GEAR), the third/reverse gear dog clutch 353 is moved into contact with the reverse driver gear 327, thereby, non-rotatably coupling the reverse driver gear 327 to the first input shaft 311. The first/fifth gear dog clutch 351, second/sixth gear dog clutch 352, third/reverse gear dog clutch 353, and fourth gear dog clutch 354 are kept out of contact with the first driver gear 321, second driver gear 322, third driver gear 323, fifth driver gear 325, sixth driver gear 326, and output driven gear 341. Thus, the first driver gear 321, third driver gear 323, and fifth driver gear 325 are free to rotate with respect to the first input shaft 311, and the second driver gear 322, sixth driver gear 326, and output driven gear 341 are free to rotate with respect to the second input shaft 312. The first clutch mechanism 313 and second clutch mechanism 314 are activated. Thus, the power split planetary gear set 316 is locked and the transmission input shaft 301, sun gear 317, ring gear 319, electric motor 303, and second input shaft 312 all rotate at the same speed. Torque to power the output shaft 302 is provided by a combination of the engine 305 and the electric motor 303. Power from the engine 305 may be supplemented by the electric motor 303 whenever desired.

In one embodiment, the hybrid dual configuration transmission may be switched from EVT-REVERSE GEAR operation to FIXED GEAR-REVERSE GEAR operation whenever additional torque to the output shaft 302 is required. Switching from EVT-REVERSE GEAR operation to FIXED GEAR-REVERSE GEAR simply requires the activation of the first clutch mechanism 313.

Deactivation of the first clutch mechanism 313 returns the hybrid dual configuration transmission to EVT-REVERSE GEAR operation.

In one embodiment, the hybrid dual configuration transmission may be operated with multiple driver gears 321, 322, 323, 325, 326, 341 engaged at the same time. Operation in this manner is particularly desirable to smooth shifts between different operation modes. To shift from operation in which torque is transferred through the first driver gear 321 (EV-1ST GEAR, EVT-1ST GEAR, FIXED GEAR-1ST GEAR) to operation in which torque is transferred through the second driver gear 322 (FIXED ENGINE DRIVE-2ND GEAR, FIXED GEAR-2ND GEAR), the first clutch mechanism 313 must be deactivated and the second clutch mechanism 314 must be activated, thereby, placing the hybrid dual configuration transmission in EVT-1ST GEAR mode. The engine 305 and electric motor 303 are powered to adjust the speed of the second input shaft 312 to match the speed of the second driver gear 322. Subsequently, the second/sixth gear dog clutch 352 is moved into contact with the second driver gear 322. At this point during the shift process, both the first driver gear 321 and second driver gear 322 are engaged and transmitting torque to the output shaft 302. The transmission can be operated in this transition state with both the first driver gear 321 and second driver gear 322 transmitting torque to the output shaft 302. To complete the shift to operation in which torque is transferred through the second driver gear 322 (EV-2ND GEAR, FIXED ENGINE DRIVE-2ND GEAR, FIXED GEAR-2ND GEAR), the first/fifth gear dog clutch 351 is moved out of contact with the first driver gear 321.

To shift from operation in which torque is transferred through the second driver gear 322 (EV-2ND GEAR, FIXED GEAR-2ND GEAR) to operation in which torque is transferred through the third driver gear 323 (EV-3RD GEAR, EVT-3RD GEAR, FIXED GEAR-3RD GEAR), the first clutch mechanism 313 must be deactivated and the second clutch mechanism 314 must be activated. The engine 305 and electric motor 303 are powered to adjust the speed of the first input shaft 311 to match the speed of the third driver gear 323. Subsequently, the third/reverse gear dog clutch 353 is moved into contact with the third driver gear 323. At this point during the shift process, both the second driver gear 322 and third driver gear 323 are engaged and transmitting torque to the output shaft 302. The transmission can be operated in this transition state with both the second driver gear 322 and third driver gear 323 transmitting torque to the output shaft 302. To complete the shift to operation in which torque is transferred through the third driver gear 323 (EV-3RD GEAR, EVT-3RD GEAR, FIXED GEAR-3RD GEAR), the second/sixth gear dog clutch 352 must be moved out of contact with the second driver gear 322.

To shift from operation in which torque is transferred through the third driver gear 323 (EV-3RD GEAR, EVT-3RD GEAR, FIXED GEAR-3RD GEAR) to operation in which torque is transferred through the output driven gear 341 (EV-4TH GEAR, FIXED GEAR-4TH GEAR), the first clutch mechanism 313 must be deactivated and the second clutch mechanism 314 must be activated, thereby, placing the hybrid dual configuration transmission in EVT-3RD GEAR mode. The engine 305 and electric motor 303 are powered to adjust the speed of the second input shaft 312 to match the speed of the fourth driver gear 324. Subsequently, the fourth gear dog clutch 354 is moved into contact with the output driven gear 341. At this point during the shift process, both the third driver gear 323 and output driven gear 341 are engaged and transmitting torque to the output shaft 302. The transmission can be operated in this transition state with both the third driver gear 323 and output driven gear 341 transmitting torque to the output shaft 302. To complete the shift to operation in which torque is transferred through the output driven gear 341 (EV-4TH GEAR, FIXED GEAR-4TH GEAR), the third/reverse gear dog clutch 353 is moved out of contact with the third driver gear 323.

To shift from operation in which torque is transferred through the output driven gear 341 (EV-4TH GEAR, FIXED GEAR-4TH GEAR) to operation in which torque is transferred through the fifth driver gear 325 (EV-5TH GEAR, EVT-5TH GEAR, FIXED GEAR-5TH GEAR), the first clutch mechanism 313 must be deactivated and the second clutch mechanism 314 must be activated. The engine 305 and electric motor 303 are powered to adjust the speed of the first input shaft 311 to match the speed of the fifth driver gear 325. Subsequently, the first/fifth gear dog clutch 351 is moved into contact with the fifth driver gear 325. At this point during the shift process, both the output driven gear 341 and fifth driver gear 325 are engaged and transmitting torque to the output shaft 302. The transmission can be operated in this transition state with both the output driven gear 341 and fifth driver gear 325 transmitting torque to the output shaft 302. To complete the shift to operation in which torque is transferred through the fifth driver gear 325 (EV-5TH GEAR, EVT-5TH GEAR, FIXED GEAR-5TH GEAR), the fourth gear dog clutch 354 must be moved out of contact with the output driven gear 341.

To shift from operation in which torque is transferred through the fifth driver gear 325 (EV-5TH GEAR, EVT-5TH GEAR, FIXED GEAR-5TH GEAR) to operation in which torque is transferred through the sixth driver gear 326 (EV-6TH GEAR, FIXED GEAR-6TH GEAR), the first clutch mechanism 313 must be deactivated and the second clutch mechanism 314 must be activated, thereby, placing the hybrid dual configuration transmission in EVT-5TH GEAR mode. The engine 305 and electric motor 303 are powered to adjust the speed of the second input shaft 312 to match the speed of the sixth driver gear 326. Subsequently, the second/sixth gear dog clutch 352 is moved into contact with the sixth driver gear 326. At this point during the shift process, both the fifth driver gear 325 and sixth driver gear 326 are engaged and transmitting torque to the output shaft 302. The transmission can be operated in this transition state with both the fifth driver gear 325 and sixth driver gear 326 transmitting torque to the output shaft 302. To complete the shift to operation in which torque is transferred through the sixth driver gear 326 (EV-6TH GEAR, FIXED ENGINE DRIVE-6TH GEAR, FIXED GEAR-6TH GEAR), the first/fifth gear dog clutch 351 is moved out of contact with the first driver gear 321.

In one embodiment, the first clutch mechanism 13 and second clutch mechanism 14 may be dry clutches to reduce parasitic losses within the transmission. In one embodiment, the first clutch mechanism 13 and second clutch mechanism 14 may be wet clutches or any other type of clutch. In one embodiment, the first/fifth gear dog clutch 51, second/sixth gear dog clutch 52, third/reverse gear dog clutch 53, and fourth gear dog clutch 54 may be any type of clutching device. In one embodiment, any desired number of driver gears and corresponding dog clutches may be used. The location and number of gears and dog clutches depicted in FIGS. 1 and 3 is for illustrative purposes only. Any layout of gears and dog clutches may be utilized. In one embodiment, the engine 5 may any type of engine 5 or torque source including, but not limited to, piston, turbine, electric, hydraulic, or pneumatic. In one embodiment, the electric motor 3 may be any type of electric motor or torque source including, but not limited to, electric, hydraulic, or pneumatic.

In one embodiment, the default state of the first clutch mechanism 13 and second clutch mechanism 14 may be deactivated. In another embodiment, the default state of the first clutch mechanism 13 may be activated and the default state of the second clutch mechanism 14 may be deactivated. In this embodiment, failure of both the first clutch mechanism 13 and second clutch mechanism 14 would still permit for electric drive of the vehicle. In one embodiment, the default state of the first clutch mechanism 13 and second clutch mechanism 14 may any desired activation state.

The transmission according the principles disclosed herein provides for a smooth shifting transmission in which torque is evenly applied to the output shaft 2 even during gear changes by allowing multiple gear ratios and driver gears to be engaged at the same time. In one embodiment, the electric motor 3 may be powered during gear changes to match the ring gear 19 speed to that of the second input shaft 12 to provide for smooth shifting. In one embodiment, during gear changes in which more than one driver gear 21, 22, 23, 25, 26, 41 are engaged at a time, power may be varied between the multiple driver gears 21, 22, 23, 25, 26, 41 to transmit a desired amount of torque to the output shaft 2 and, thereby, vehicle wheels. In one embodiment, the first driver gear 21, second driver gear 22, and third driver gear 23 achieve an underdrive gear ratio in which the rotational speed of the output shaft 2 is less than the rotational speed of the transmission input shaft 1, the output driven gear 41 achieves a unity gear ratio in which the rotational speed of the output shaft 2 equals the rotational speed of the transmission input shaft 1, and the fifth driver gear 25 and sixth driver gear 26 achieve an overdrive gear ratio in which the rotational speed of the output shaft 2 exceeds the rotational speed of the transmission input shaft 1.

In one embodiment, the disclosed transmission provides for improved efficiency and reduced parasitic losses over conventional automatic and conventional hybrid transmission by utilizing a modified manual transmission structure that eliminates the many hydraulic clutches and planetary gear sets of a conventional automatic transmission. In addition, in some embodiments the transmission requires no hydraulic pressure to provide propulsion. The transmission also provides for improved efficiency and performance when operated in EVT-1ST GEAR, EVT-3RD GEAR, EVT-5TH GEAR and EVT-REVERSE GEAR modes. When operated in one of the EVT modes, the electric motor 3 of the transmission is powered to rotate at the RPM required to keep the engine 5 rotating at the optimum speed for the conditions. In one embodiment, where efficiency is desired, the electric motor 3 is powered to rotate at a speed to cause the engine 5 to rotate at the optimum speed for engine efficiency. In another embodiment where efficiency is desired, the electric motor 3 is powered to rotate at a speed to cause the engine 5 to rotate at the speed that achieves optimum efficiency for both the electric motor 3 and engine 5. In one embodiment in which maximum torque is desired at the output shaft, the electric motor 3 is powered to rotate at a speed to cause the engine 5 to rotate at a speed within the engine's torque peak. In one embodiment, the transmission provides for engine 5 start/stop capability to reduce fuel consumption and prevent wear to the engine 5 when the engine 5 is not required to provide torque.

In one embodiment, the transmission includes a hill hold capability utilizing the properties of the one way clutch 4. In one embodiment, the transmission is capable of producing electricity upon deceleration or braking by using the electric motor 3 as a generator. In one embodiment, the engine 5 provides the torque to generate electricity using the electric motor 3. In one embodiment, the transmission provides for engine 5 start by activating the first clutch mechanism 13 and powering the electric motor 3. Engine 5 start utilizing this embodiment reduces the torque required from electric motor 3 for the electric start by approximately 50% in comparison to typical prior art hybrid transmissions. In one embodiment, the transmission provides for engine 5 start by reversing the direction of the electric motor 3, non-rotatably coupling at one of the driver gears 21, 23, 25 to the first input shaft 11, non-rotatably coupling one of the driver gears 22, 26 or the output driven gear 41 to the second input shaft 12, and utilizing the one way properties of the one way clutch 4 to start the engine 5.

It should be appreciated that each EVT mode (EVT-1ST GEAR, EVT-3RD GEAR, EVT-5TH GEAR and EVT-REVERSE GEAR) may be locked in a fixed gear configuration by activating the first clutch mechanism 13. Likewise, it should be appreciated that the electric motor 3 may be utilized to provide additional torque to the output shaft 2 simply by activating the first clutch mechanism 13 when the transmission is operated in each fixed gear mode (FIXED GEAR-2ND GEAR, FIXED GEAR-4TH GEAR, FIXED GEAR-6TH GEAR). It should also be appreciated that the transmission may be operated with torque provided exclusively by the electric motor 3 in any of the disclosed modes.

It should also be appreciated that the EV modes of operation (EV, EV (ENGINE START), EV-1ST GEAR, EV-2ND GEAR, EV-3RD GEAR, EV-4TH GEAR, EV-5TH GEAR, EV-6TH GEAR, EV-REVERSE GEAR) provide for operation exclusively using the electric motor 3 without any need for the engine 5. Further, in EV mode, no hydraulic pressure is needed within the transmission to operate the clutch mechanisms 13, 14 and provide for vehicle propulsion.

In one embodiment, the power split planetary gear set 16, one way clutch 4, and electric motor 3 are adapted for use with a traditional manual transmission. In one embodiment, the power split planetary gear set 16, one way clutch 4, and electric motor 3 are adapted for use with an automated manual transmission.

Thus, a hybrid dual configuration transmission having improved efficiency and smooth shifting is disclosed. The hybrid dual configuration transmission provides improved operating configurations and a torque boost when required. The hybrid dual configuration transmission provides for smooth vehicle launching, start/stop functionality, regenerative braking, a hill hold feature, and reduced complexity. The hybrid dual configuration transmission provides engine start/stop capability at any vehicle speed (including zero), creep torque, electric drive at any speed, silent start, regenerative braking capabilities, synchronous shifting, and vehicle launching capability in an electronically variable transmission mode.

What is claimed is:
1. A hybrid transmission comprising:
a transmission input shaft;
an electric motor;
planetary gear set coupled to said electric motor;
a first clutch mechanism coupled to said planetary gear set;
a second clutch mechanism coupled to said transmission input shaft and said planetary gear set;
a first input shaft coupled to said planetary gear set;
a second input shaft coupled to said second clutch mechanism;
an output shaft;
a first plurality of gears coupled to said output shaft;

a second plurality of gears coupled to said output shaft; and
a one way clutch, wherein
said first input shaft is coupled to said first plurality of gears to provide a first plurality of gear ratios between said transmission imut shaft and said output shaft.
said second input shaft is coupled to said second plurality of gears to provide a second plurality ofgear ratios between said transmission input shaft and said output shaft,
said electric motor is coupled to a sun gear of said planetary gear set,
said first input shaft is coupled to a carrier of said planetary gear set,
said first clutch mechanism selectively couples said sun gear to a ring gear of said planetary gear set,
said transmission input shaft is coupled to said ring gear,
said second clutch mechanism selectively couples said transmission input shaft to said second input shaft, and
said one way clutch couples said second clutch mechanism to a transmission housing and said one way clutch permits said second input shaft to rotate in a first direction but prevents said second input shaft from rotating in a second, opposite direction of rotation.

2. A hybrid transmission comprising;
a transmission input shaft;
an electric motor;
a planetary gear set coupled to said electric motor;
a first clutch mechanism coupled to said planetary gear set;
a second clutch mechanism cou led to said transmission in ut shaft and said gear set;
a first input shaft coupled to said planetary gear set:
a second in ut shaft cou led to said second clutch mechanism; and
a one way clutch, wherein said one way clutch couples said second clutch mechanism to a transmission housing and said one way clutch permits said second input shaft to rotate in a first direction but prevents said second input shaft from rotating in a second, opposite direction of rotation.

3. The hybrid transmission of claim 2, further comprising:
an output shaft;
a first plurality of gears coupled to said output shaft; and
a second plurality of gears coupled to said output shaft, wherein:
said first input shaft is selectively coupled to said first plurality of gears to provide a first plurality of gear ratios between said transmission input shaft and said output shaft, and
said second input shaft is selectively coupled to said second plurality of gears to provide a second plurality of gear ratios between said transmission input shaft and said output shaft.

4. The hybrid transmission of claim 2, wherein:
said electric motor is coupled to a sun gear of said planetary gear set,
said first input shaft is coupled to a carrier of said planetary gear set,
said first clutch mechanism selectively couples said sun gear to a ring gear of said planetary gear set,
said transmission input shaft is coupled to said ring gear, and
said second clutch mechanism selectively couples said transmission input shaft to said second input shaft, 5. A method of operating a hybrid transmission comprising a transmission input shaft, an electric motor, a planetary gear set coupled to said electric motor, a first clutch mechanism coupled to said planetary gear set, a second clutch mechanism coupled to said transmission input shaft and said planetary gear set, a first input shaft coupled to said planetary gear set, a second input shaft coupled to said second clutch mechanism, an output shaft, a first plurality of gears coupled to said output shaft, and a second plurality of gears coupled to said output shaft, wherein:
said first input shaft is coupled to said first plurality of gears to provide a first plurality of gear ratios between said transmission input shaft and said output shaft, and
said second input shaft is coupled to said second plurality of gears to provide a second plurality of gear ratios between said transmission input shaft and said output shaft, said method comprising:
placing said first clutch mechanism in a deactivated state; if said second clutch mechanism is in a deactivated state:
engaging a gear ratio from said second plurality of gear ratios,
activating said second clutch mechanism after said gear ratio from said second plurality of gear ratios is engaged, and
disengaging a gear ratio from said first plurality of gear ratios after said second clutch mechanism is activated; and
if said second clutch mechanism is in an activated state:
engaging a gear ratio from said first plurality of gear ratios, and
deactivating said second clutch mechanism after said gear ratio from said first plurality of gear ratios is engaged.

6. The method of operating the hybrid transmission of claim 5, wherein said electric motor is coupled to said sun gear, said first input shaft is coupled to a carrier of said planetary gear set, said transmission input shaft is coupled to said ring gear, said method further comprising activating said first clutch mechanism when a gear ratio from said second plurality of gears is engaged and powering said electric motor to increase torque applied to said output shaft.

7. The method of operating the hybrid transmission of claim 6, further comprising activating said first clutch mechanism when a gear ratio from said first plurality of gears is engaged to lock said hybrid transmission in a fixed gear configuration and increase torque applied to said output shaft.

8. The method of operating the hybrid transmission of claim 5, further comprising disengaging a gear ratio from said second plurality of gear ratios after said second clutch mechanism is deactivated if said second clutch mechanism is initially in an activated state.

9. The method of operating the hybrid transmission of claim 5, wherein the hybrid transmission is operated for at least a period of time with a gear ratio from each of said first plurality of gear ratios and said second plurality of gear ratios engaged simultaneously.

10. The method of operating the hybrid transmission of claim 5, wherein:
a rotational speed of said ring gear is adjusted to approximately match a rotational speed of said second input shaft if a gear from said second plurality of gear ratios is to be engaged; and
a rotational speed of said first input shaft is adjusted to approximately match a rotational speed of a gear from said first plurality of gears if a gear from said first plurality of gear ratios is to be engaged.

11. The method of operating the hybrid transmission of claim 5, wherein the rotational speed of said ring gear is adjusted simultaneously with the engagement of said gear from said second plurality of gear ratios to be engaged, and the rotational speed of a gear from said first plurality of gears is adjusted prior to the engagement of said gear ratio to be engaged from said first plurality of gear ratios.

12. The method of operating the hybrid transmission of claim 5, wherein said hybrid transmission further comprises a one way clutch, wherein said one way clutch couples said second clutch mechanism to a transmission housing and said one way clutch permits said second input shaft to rotate in a first direction but prevents said second input shaft from rotating in a second, opposite direction of rotation, said method further comprising:
   non-rotatably coupling one of said first plurality of gear ratios to said first input shaft;
   non-rotatably coupling one of said second plurality of gear ratios to said second output shaft;
   activating said second clutch mechanism; and
   powering said electric motor to rotate said transmission input shaft and start an engine coupled to said transmission input shaft.

13. A method of operating a hybrid transmission comprising a transmission input shaft, an electric motor, a planetary gear set coupled to said electric motor, a first clutch mechanism coupled to said planetary gear set, a second clutch mechanism coupled to said transmission input shaft and said planetary gear set, a first input shaft coupled to said planetary gear set, a second input shaft coupled to said second clutch mechanism, an output shaft, a first plurality of gears coupled to said output shaft, and a second plurality of gears coupled to said output shaft, wherein:
   said first input shaft is coupled to said first plurality of gears to provide a first plurality of gear ratios between said transmission input shaft and said output shaft, and
   said second input shaft is coupled to said second plurality of gears to provide a second plurality of gear ratios between said transmission input shaft and said output shaft, said method comprising:
   placing said first clutch mechanism in a deactivated state;
   placing said second clutch mechanism in an activated state;
   if a gear ratio from said second plurality of gear ratios is to be engaged:
      engaging a gear ratio from said second plurality of gear ratios, and
      disengaging a gear ratio from said first plurality of gear ratios after said gear ratio from said second plurality of gear ratios is engaged; and
   if a gear ratio from said first plurality of gear ratios is to be engaged:
      engaging a gear ratio from said first plurality of gear ratios, and
      disengaging a gear ratio from said second plurality of gear ratios after said gear ratio from said first plurality of gear ratios is engaged.

14. The method of operating the hybrid transmission of claim 13, wherein said electric motor is coupled to a sun gear of said planetary gear set, said first input shaft is coupled to a carrier of said planetary gear set, said first clutch mechanism selectively couples said sun gear to a ring gear of said planetary gear set, said second transmission input shaft is coupled to said ring gear, and said second clutch mechanism selectively couples said transmission input shaft to said ring gear and said second input shaft, said method further comprising activating said first clutch mechanism to lock said hybrid transmission in a fixed gear configuration and increase torque applied to said output shaft.

15. The method of operating the hybrid transmission of claim 13, wherein the hybrid transmission is operated for at least a period of time with at least one gear ratio from each of said first plurality of gear ratios and said second plurality of gear ratios engaged simultaneously.

16. The method of operating the hybrid transmission of claim 13, further comprising:
   if a gear ratio from second plurality of gear ratios is to be engaged: adjusting the rotational speed of said second input shaft to approximate the rotational speed of said gear from said second plurality of gears corresponding to said gear ratio; and
   if a gear ratio from first plurality of gear ratios is to be engaged: adjusting the rotational speed of said first input shaft to approximate the rotational speed of said gear from said first plurality of gears corresponding to said gear ratio.

* * * * *